United States Patent [19]

Macovski et al.

[11] 4,165,462
[45] Aug. 21, 1979

[54] VARIABLE CODE GAMMA RAY IMAGING SYSTEM

[76] Inventors: Albert Macovski, 2505 Alpine Rd., Menlo Park, Calif. 94025; Dov Rosenfeld, 260 San Jose Ave., San Francisco, Calif. 94110

[21] Appl. No.: 794,117

[22] Filed: May 5, 1977

[51] Int. Cl.² .................. G01T 1/20; G01N 21/34
[52] U.S. Cl. ........................ 250/363 S; 250/445 T
[58] Field of Search .............. 250/363 S, 369, 505, 250/514

[56] References Cited

U.S. PATENT DOCUMENTS 3,748,470  7/1973  Barrett ........................ 250/363 S
3,840,747  10/1974  Macovski ...................... 250/369

*Primary Examiner*—Alfred E. Smith
*Assistant Examiner*—Janice A. Howell

[57] ABSTRACT

A gamma-ray source distribution in the body is imaged onto a detector using an array of apertures. The transmission of each aperture is modulated using a code such that the individual views of the source through each aperture can be decoded and separated. The codes are chosen to maximize the signal to noise ratio for each source distribution. These codes determine the photon collection efficiency of the aperture array. Planar arrays are used for volumetric reconstructions and circular arrays for cross-sectional reconstructions.

14 Claims, 6 Drawing Figures

VARIABLE CODE GAMMA RAY IMAGING SYSTEM

BACKGROUND OF THE INVENTION

1. Field of the Invention

This invention relates to gamma-ray imaging systems as used in nuclear medicine. In a primary application the invention relates to three-dimensional tomographic imaging of an administered isotope in the body.

2. Description of Prior Art

Existing nuclear medicine cameras suffer from three primary difficulties; low collection efficiency, poor lateral resolution and a lack of depth delineation. These difficulties stem primarily from the imaging structure. Since these high energy photons cannot be imaged with a lens, pinhole and parallel hole collimators are used with their resultant low collection efficiency. The collection efficiency can be improved somewhat by increasing the size of the pinholes, with a resultant reduction in lateral resolution. In addition, these imaging systems inherently produce a single projection image of the source, with no depth information. The various source planes parallel to the detector are essentially compressed into a single image.

A number of methods have been considered to overcome one or more of these problems. One of these is the use of a multi-aperture plate which provides a coded version of the image. The image is then decoded to provide the desired three-dimensional source distribution. Such a system is described in a paper by H. H. Barrett entitled, "Fresnel Zone Plate Imaging in Nuclear Medicine" in the Journal of Nuclear Medicine, Vol. 13, pages 382-285, 1972. This system, and many similar versions of it, have been found to provide an improved signal-to-noise ratio only for very small sources. For larger sources the performance becomes significantly worse than that of a single pinhole. In addition, the depth delineation is blurred with the information of adjacent planes appearing in the background.

Another system for providing three-dimensional reconstructions was described by T. Budinger and G. T. Gullberg entitled, "Three-Dimensional Reconstruction in Nuclear Medicine Emission Imaging," in the *IEEE Transactions* on Nuclear Science, NS-21, 1974. This system used a standard nuclear medicine camera to collect an array of projection images from different angles. This projection information is then used to provide a three-dimensional reconstruction using mathematical techniques identical to those used in radiographic computerized axial tomography systems such as those of EMI. Although these systems provide excellent three-dimensional reconstructions they do so at greatly increased dosage to the patient. The efficiency of each projection is unchanged over conventional systems, and the increased number of projections requires increased dosage. In addition, since the projections are taken in sequence, images of moving organs will be smeared because of the long data acquisition time.

A similar system was described by L. T. Chang, B. Mac Donald and V. Perez-Mendez entitled, "Axial Tomography and 3-Dimensional Image Reconstruction," in the IEEE Transactions on Nuclear Science, NS-23, pages 568-572, 1976. Here the sequence of views are taken using a single pinhole in different positions. As before, the collection efficiency is not improved since the various views or projections are taken one at a time. This paper, however, does introduce a Fourier transform reconstruction method for the array of pinhole views.

A system which provides the desired three-dimensional imaging with significantly improved collection efficiency is described in U.S. Pat. No. 3,840,747 issued Oct. 8, 1974 to Albert Macovski. In this patent an array of pinhole apertures are used to provide different views of the source. Rather than opening these in sequence, as in the system described by Chang, the various apertures are modulated, or turned on and off, with shutters. Each aperture is modulated with a different orthogonal function. The superimposed projection images on the detector are recorded as a function of time. These are then decoded, using the same orthogonal functions, to produce a separated array of different views of the source. These are used, as previously described, to reconstruct a three-dimensional image of the source. However, most importantly, since a number of views are collected simultaneously the collection efficiency is significantly improved and the data acquisition time is greatly reduced.

This system of U.S. Pat. No. 3,840,747, however does not indicate a method for choosing the orthogonal modulation functions to the specific requirements of the source being viewed. Thus certain types of sources, such as those having relatively large areas, provide poorer resultant signal-to-noise ratio than systems which acquire the views in sequence. In addition, this patent did not show a system which provided a complete array of views for accurately reconstructing a cross-sectional slice of the source.

SUMMARY OF THE INVENTION

An object of this invention is to provide three-dimensional tomographic images of an emitting source having high signal-to-noise ratio. It is also an object of this invention to acquire the required individual projection views of the source in a short time interval. It is also an object of this invention to acquire the required projection data and reconstruct cross-sectional axial images of the source.

Briefly, in accordance with the invention an array of apertures are positioned between a gamma-ray emitting source and a detector. Each aperture is modulated with a code which is chosen based on the configuration of the source. The detected signals are decoded so as to provide isolated views of the source from different angles. These views are used to reconstruct a three-dimensional tomographic image of the source. The codes are chosen to provide the optimum number of apertures open at any time so as to maximize the signal-to-noise ratio of the resultant image.

BRIEF DESCRIPTION OF THE DRAWINGS

For a more complete disclosure of the invention, reference may be made to the following detailed description of several illustrative embodiments thereof which is given in conjunction with the accompanying drawings, of which.

DESCRIPTION OF THE PREFERRED EMBODIMENT

Figure 1:
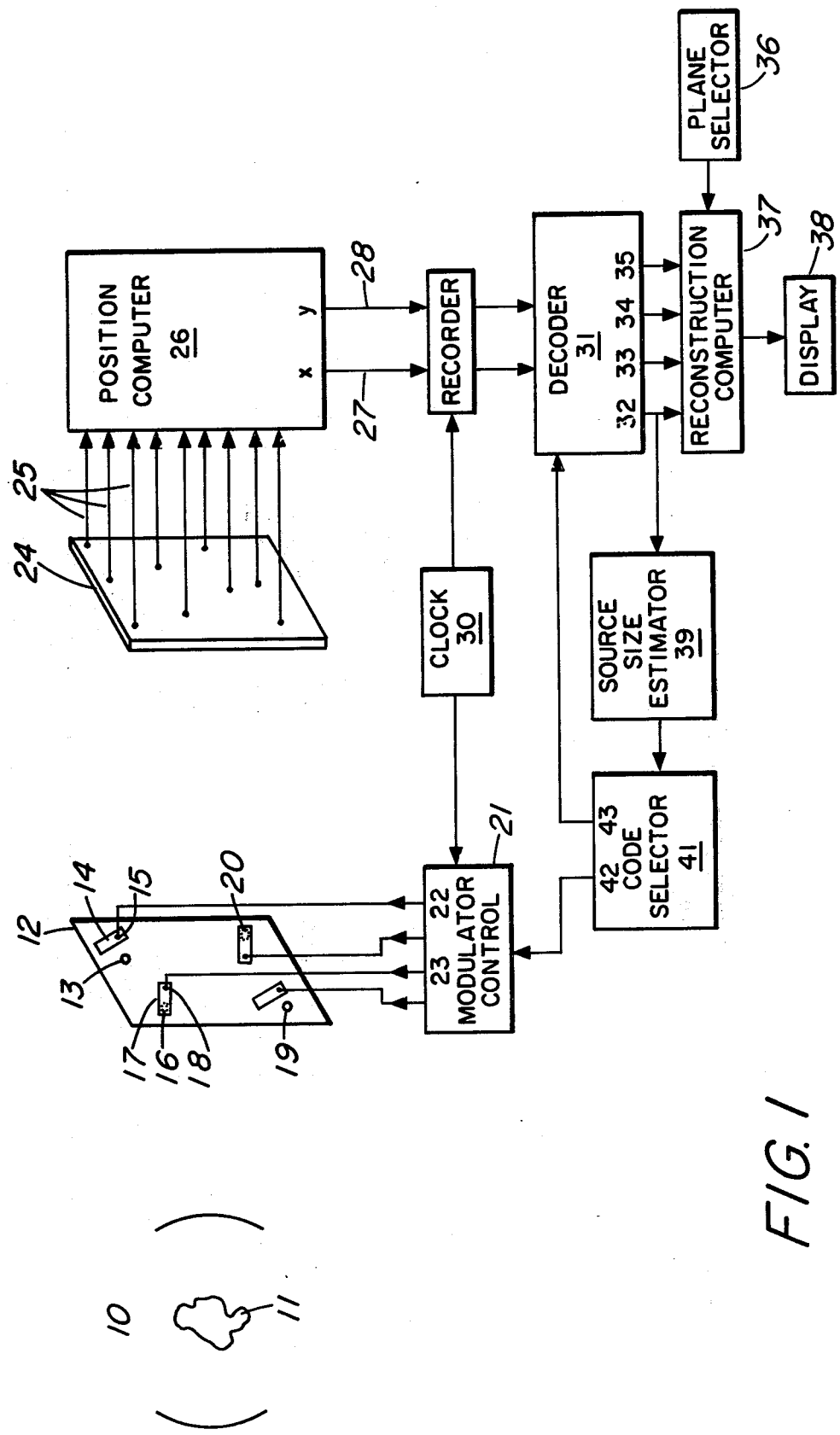
FIG. 1 is a schematic representation illustrating an embodiment of the invention using a planar detector array.

An understanding of the broad aspects of the invention may best be had by reference to FIG. 1 of the drawings. An object 10, normally a region of the human anatomy such as the head or abdomen, is being studied by nuclear medicine techniques. A radioisotope has been administered and been selectively deposited in a diseased region as illustrated. Thus the deposited radioisotope 11 becomes a radioactive source of gamma rays. It is desired to produce a three-dimensional image of this source distribution in order to fully diagnose the disease.

Figure 1A:
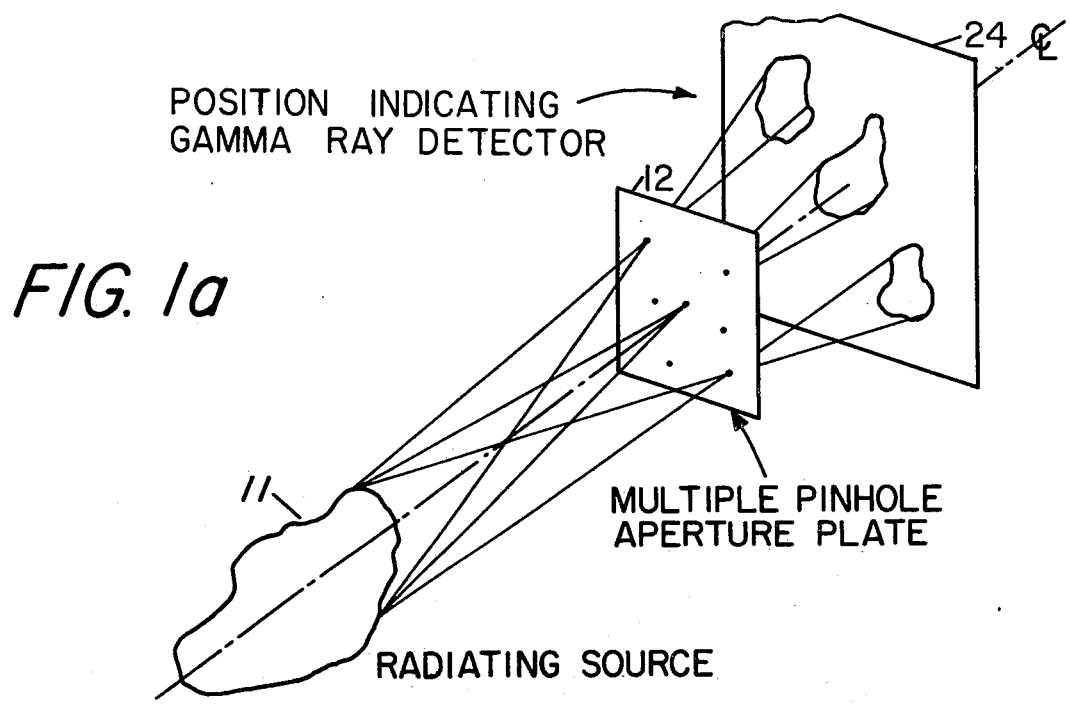
FIG. 1A is a simplified drawing of the embodiment using a planar detector array.

Aperture array plate 12 is used to provide an array of projection images of source 11 onto detector array 24. Each aperture of aperture array 12 is essentially a pinhole camera which forms an image of source 11 onto detector array 24 as shown in FIG. 1A. Each of these images from the different apertures is somewhat different since it represents a projected image of the source from a different angle. For purposes of illustration, four apertures are shown in FIG. 1; 13, 16, 19, and 20. In practice between ten and five hundred would be used. If these apertures were always open, their resultant projected images would be superimposed and could never be separated. It is essential to provide separated projection images in order to reconstruct a three-dimensional image. The separation is provided by modulating the transmission of the apertures using coding signals. The transmission is modulated, in FIG. 1, using mechanical shutters which determine whether gamma rays go through the aperture. Shutter 14 is used to control the transmission through aperture 13. It is controlled by rotator 15, which can be a small motor or an electromagnet which allows shutter 14 to obscure or open aperture 13. Similarly shutter 17, which is shown obscuring aperture 16, is controlled by rotator 18. Aperture 19 is shown with an open shutter and aperture 20 is shown obscured. The coding and control procedures will be subsequently described.

Following detection, it is desired to record the position of each detected gamma ray event and its time of detection. This data, which contains the coded superposition of the views through all of the apertures, is subsequently decoded to provide an array of projection signals representing the intensity of a projected image of the source through each aperture. The detector array 24 can be one of a number of standard position-sensitive detector systems presently used in nuclear medicine cameras. These include the Anger camera, manufactured by Nuclear Chicago Corporation and others, which contains a large area sodium iodide crystal followed by an array of photomultipliers. The position of the gamma ray scintillation determines the relative intensity at each photomultiplier. These signals are applied to position-computer 26 which can perform a simple centroid calculation to find the x and y coordinates of each event. Other detector arrangements include the Baird-Atomic System 70 which contains a 14×21 array of scintillating crystals with the row and column outputs optically coupled to 35 photomultipliers. In this case position-computer 26 simply assigns the appropriate x and y values to each scintillation event based on the row and column. A third camera system providing relatively high resolution is the Xenon multiwire chamber. This detector includes row and column wires in a high pressure Xenon chamber. As before, the row and column outputs are applied to the position-computer to indicate the x and y coordinates of each event. A wire chamber was described by L. Kaufman, et. al., "Wire Spark Chambers for Clinical Imaging of Gamma Rays," Physics in Medicine and Biology, Vol. 18, No. 3, p. 417, 1971.

The position coordinate detector signals 27 and 28 thus define the x and y coordinates of each event. These may be decoded directly and used to provide the projected images which are then used to form the reconstructed tomographic image of the source. It is usually more convenient, however, to store these signals using recorder 29 which can be a digital tape recorder. This recording includes a clock track to synchronize the various events with the opening and closing of the various shutters. Thus the modulator control 21, which drives the various shutters, and the recorder 29 are driven by a clock 30. In order to decode the detector signals 27 and 28 the corresponding times of the opening and closing of the modulated apertures must be known.

Each aperture is modulated with a unique code which can subsequently be decoded to provide a projection signal representing the projected image through that aperture. The code is a binary sequence of ones and zeroes which represent respectively the opening and closing times of the aperture. The code used to illustrate previously described U.S. Pat. No. 3,840,747 consisted of alternating between one and zero. Each aperture was modulated in this same fashion with a different frequency. Thus each aperture, on the average, was open half of the time. This code, however, will not provide the optimum signal-to-noise ratio for all source configurations 11.

Figure 2:
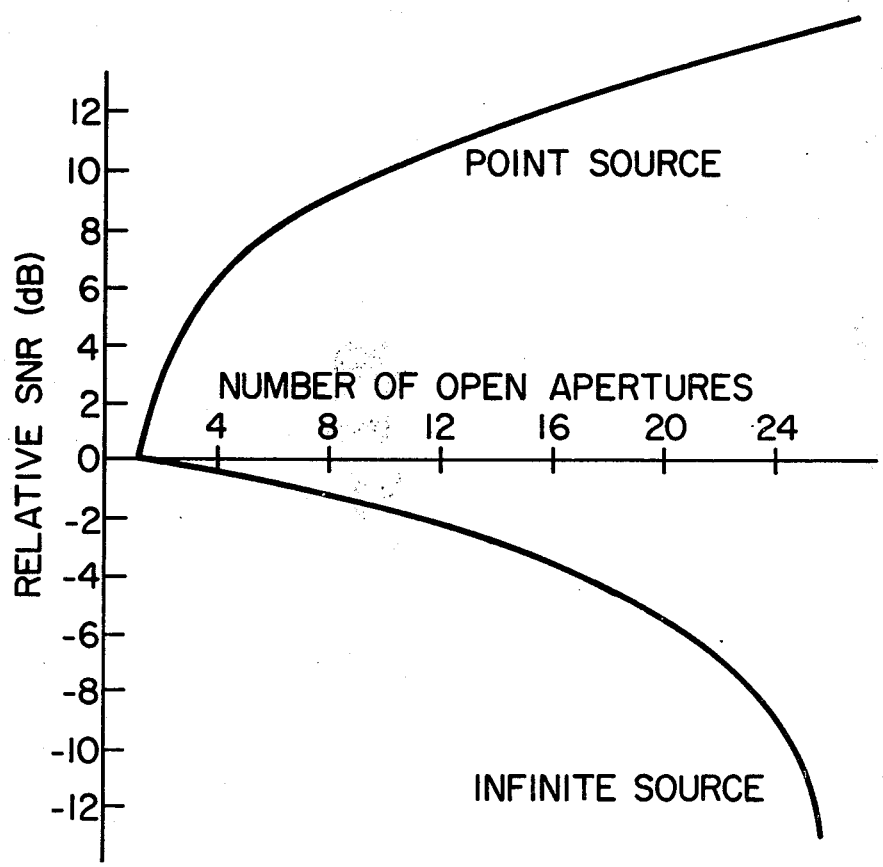
FIG. 2 is a set of graphs indicating the performance of the system for different object sizes.

The signal-to-noise ratio is determined by the number of apertures which are open at any time interval or, similarly, the number of views being detected at any time. For each source configuration there exists an optimum number of views which should be detected at any given time. This is described in detail in a recent paper by the inventors D. Rosenfeld and A. Macovski, entitled "Source Dependent Imaging in Nuclear Medicine" in Proceedings of the 1976 Symposium on Computer-Aided Diagnosis of Medical Images sponsored by the IEEE Computer Society in November 1976. In this paper it is shown that the various codes used at each aperture can be parametrized by the number of apertures open at any time, and that this number has an optimum value for each source configuration. As a simple illustration, FIG. 2 is a plot of the relative signal-to-noise ratio versus the number of open apertures at any time for a system using 25 apertures. The term relative signal-to-noise ratio represents the ratio of the signal-to-noise ratio to that of a single pinhole. As can be seen, the optimum for an infinite source is one. This simply means that the best performance in this limiting case is achieved by sequentially opening the apertures, one at a time, as in the previously referenced system described by Chang, et. al. For a very small source, however, the converse is true in that the optimum occurs where all but one of apertures is open at any time.

Each of these extremes, as appropriately represented by ones and zeroes, can be decoded to provide the desired projected images through each aperture for reconstructing a 3-D tomographic image of the source. For minimizing patient radiation dose, and providing the best image in the shortest time interval, it is essential that the optimum signal-to-noise ratio be used for each source configuration. Thus the codes used are based on the configuration or size of the source.

Once a code is determined, the corresponding decoding function can be determined by the pseudo-inverse of the code matrix. These operations are described in a publication by D. G. Luenberger entitled, *Optimization by Vector Space Methods,* John Wiley, 1969. In general each decoding function of the matrix provides an output only for the desired code at the desired aperture and averages to zero for all other codes at other apertures. Thus the coding and decoding signals represent an orthogonal set of functions. As a simple illustration consider a five aperture system where, for the source size being used, it is desired to have two apertures open at any given time. Thus a "5 choose 2" code can be used where the modulated apertures go through all of the combinations of 5 things taken 2 at a time or $$\binom{5}{2} = 10.$$

The coding matrix is illustrated below where each column represents an aperture and each row a time interval of the aperture modulators or shutters.

$$\begin{bmatrix} 1 & 1 & 0 & 0 & 0 \\ 1 & 0 & 1 & 0 & 0 \\ 1 & 0 & 0 & 1 & 0 \\ 1 & 0 & 0 & 0 & 1 \\ 0 & 1 & 1 & 0 & 0 \\ 0 & 1 & 0 & 1 & 0 \\ 0 & 1 & 0 & 0 & 1 \\ 0 & 0 & 1 & 1 & 0 \\ 0 & 0 & 1 & 0 & 1 \\ 0 & 0 & 0 & 1 & 1 \end{bmatrix}$$

The resultant signals are decoded by decoder 31. Here the recorded detector signals 27 and 28 are multiplied by each of the array of decoding signals. The matrix of decoding signals for the "5 choose 2" example is given below. The 1/12 is a normalizing constant which provides unity output $$\frac{1}{12}\begin{bmatrix} 3 & 3 & 3 & 3 & -1 & -1 & -1 & -1 & -1 & -1 \\ 3 & -1 & -1 & -1 & 3 & 3 & 3 & -1 & -1 & -1 \\ -1 & 3 & -1 & -1 & 3 & -1 & -1 & 3 & 3 & -1 \\ -1 & -1 & 3 & -1 & -1 & 3 & -1 & 3 & -1 & 3 \\ -1 & -1 & -1 & 3 & -1 & -1 & 3 & -1 & 3 & 3 \end{bmatrix}$$

at the desired projection signals from the desired aperture, and zero for all others. Each row in the decoding matrix represents a different aperture with the columns representing the time intervals of the code. Thus if we multiply and then add each element of a row in the decoding matrix with each element of the column in the coding matrix, the result is unity in one column, corresponding to the desired aperture, and zero in all others.

Thus the decoder 31 involves multiplying the signals 27 and 28 by the various decoding functions and adding together the outputs corresponding to each x, y coordinate for each projection image. For example, in the system shown in FIG. 1 using four apertures, four projection signals; 32, 33, 34, and 35 would be derived through multiplication with the appropriate stored decoding functions. Each of these signals represents positive and negative values corresponding to the various x,y coordinates of the received events. These are then applied to reconstruction computer 37. At this computer, the individual projected images of the source through each aperture are assembled from the projection signals 32-35. This assembly is accomplished using four two-dimensional storage structures, such as digital storage, where the increments and decrements will take place at each position. Except for the finite counting statistics, each stored projection image will represent the view from each aperture 13, 16, 19 and 20.

These individual images from different views are then used to reconstruct the desired tomographic plane from source 11, using reconstruction computer 37, and display the plane on display 38. The desired plane in source 11 is selected using plane selector 36 which alters the computer program. The reconstruction can take place using the Fourier method from the previously referenced work by Chang, et. al. Alternatively an iterative procedure can be used where a set of values in the volume are assumed and then compared with the measured projections. The error is distributed amongst the reconstructed values in a series of iterations until an acceptable reconstruction is achieved. This system is described in a paper by R. Gordon entitled, "A Tutorial on Algebraic Reconstruction Techniques," in the IEEE Transactions on Nuclear Science, NS-21, pages 78-93, 1974.

We have described a system using a specific coding and decoding function. As previously mentioned, for optimum performance, the coding and decoding combination must depend on the object. One approach to this problem is to use apriori information about the size of the object. For example, if the study is of a relatively small organ, such as the thyroid, a code is chosen where most of the apertures are open at any time. Conversely if a large organ is being studied, such as the liver, a code is used where very few of the apertures are open at any time. Each of these situations will provide the maximum signal-to-noise ratio for the particular source used.

The desired code, based on anticipated source size, is manually inserted into code selector 41. Code selector 41 then selects a set of coding and decoding functions having the appropriate number of apertures on at any time. Output terminal 42 provides the encoding signals which control the aperture modulators. In the embodiment of FIG. 1 this signal drives modulator control 21 which controls the aperture shutters. For example, outputs 22 and 23 from the modulator control are used to actuate rotators 15 and 18 which control shutters 14 and 17 respectively. Output terminal 43 provides the decoding functions corresponding to the selected code. As previously described, these are applied to decoder 31 to decode the signals corresponding to each aperture.

In many clinical situations, such as in looking for tumors, the source size is unknown. In that case the optimum code is not known. The source size can be estimated by initially studying one of the projection images during the initial portion of the study. For example, some intermediate code can be selected, knowing it is non-optimum. One of the decoded projection signals, having relatively few photon counts, can be used to estimate the source size. For example signal 32, corresponding to the view from a single aperture, can be applied to source size estimator 39. The source size estimator can perform a relatively simple calculation such as the ratio of the total number of counts in all of the coordinate positions to that of the maximum at any position. This ratio will be unity for a point object, and will be equal to the total number of picture elements for a uniform object. Thus the ratio can provide a reasonable estimate of the source size which is then coupled to code selector 41.

Many variations can be used on obtaining this estimate. To provide an improved single projection signal, only one aperture can be opened during the estimation interval. Alternatively, rather than use a single projection, a reconstruction at a specific plane, from reconstruction computer 37, can be used to estimate the source size. Once the estimation interval is over and an optimum code is selected, the normal operation previously described is used to provide the desired reconstructed plane on display 38.

A number of methods can be used to choose the optimum code, or optimum number of open apertures, given the source configuration. A table look-up system can be used which selects the code based on the estimate of the source size. Alternatively, a computation can be performed, based on the methods described in the previously referred to paper by D. Rosenfeld and A. Macovski, to maximize the signal-to-noise ratio for a given source size. The maximization can be based on the average signal-to-noise ratio over the entire image, or over that portion of the image having the poorest signal-to-noise ratio.

Figure 3:
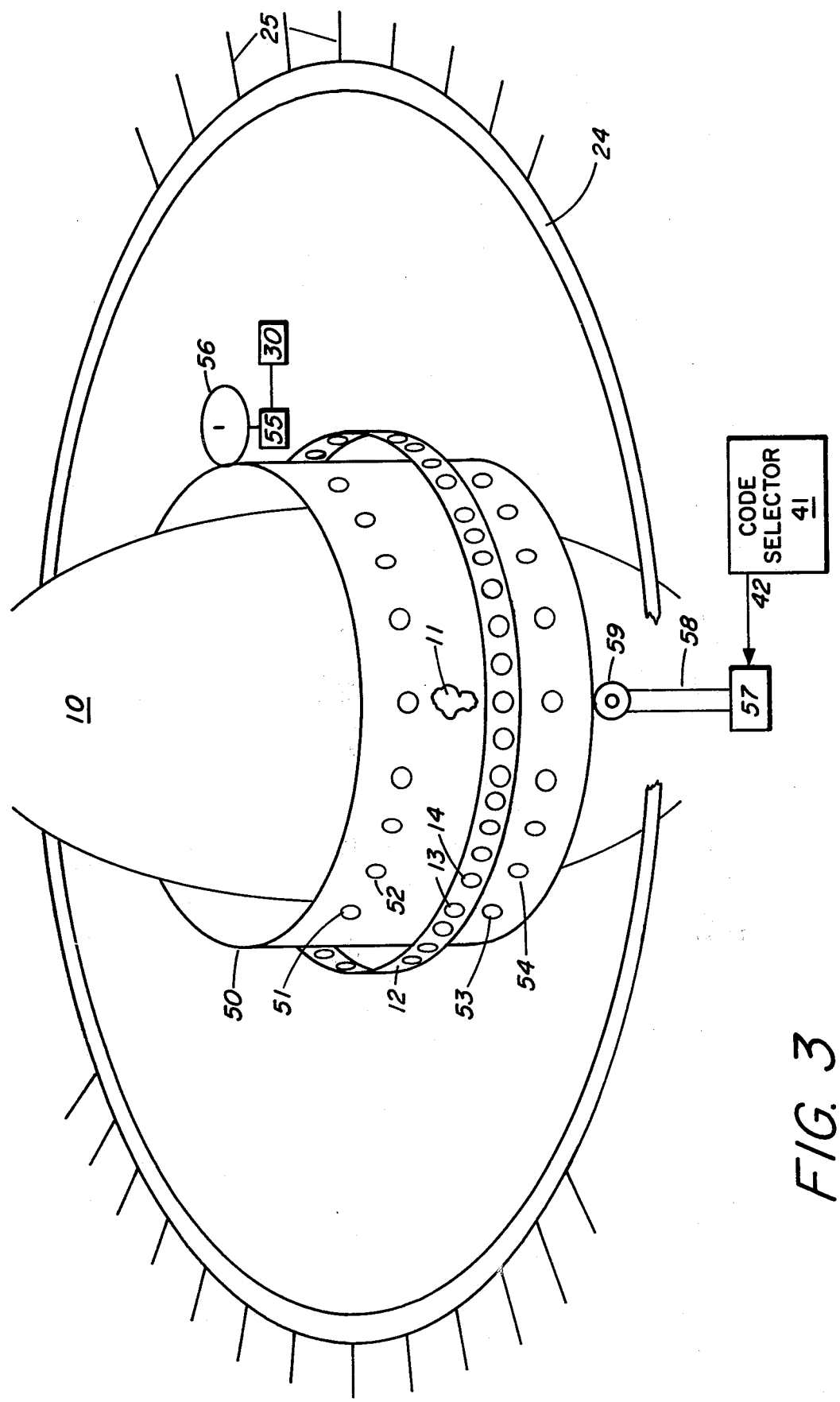
FIG. 3 is a schematic representation illustrating an embodiment of the invention using an annular detector array.
Figure 3A:
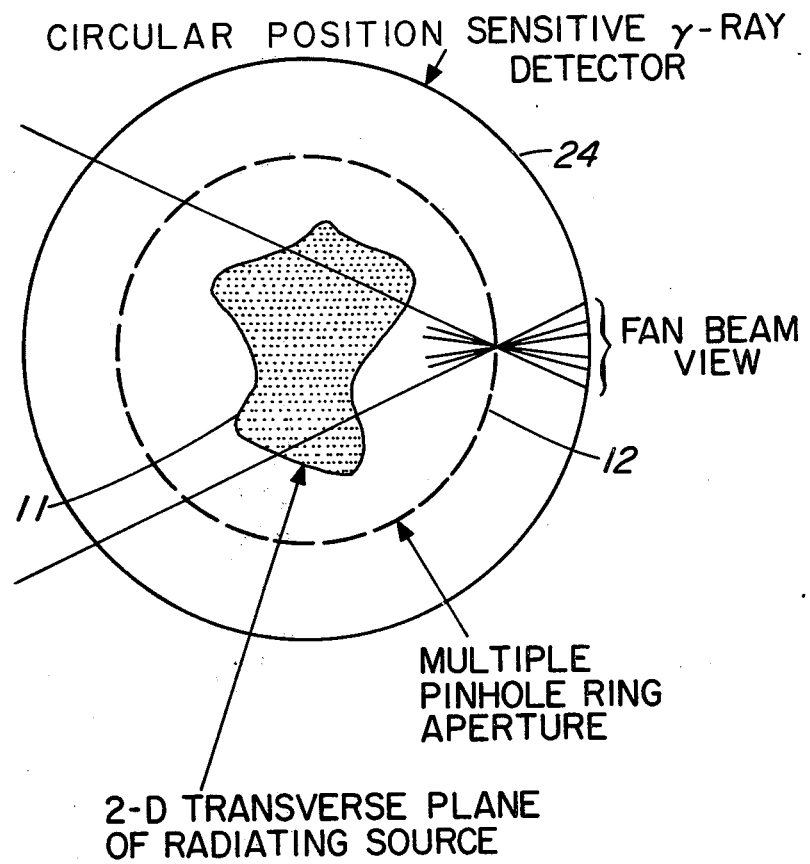
FIG. 3A is a simplified drawing of the embodiment using an annular detector array.

The system previously described provided projection images of the source from a limited number of angles. The resultant reconstructions from imaging systems of this type are not as accurate as those which provide projection images from all angles. An example of this latter system is shown in FIG. 3. In this embodiment, it is desired to reconstruct a tomographic cross-sectional image of a plane in source 11. The desired plane is defined by the plane of the circular ring aperture array 12 which contains a continuous array of apertures, such as apertures 13 and 14, around the entire ring so as to provide views at all angles. The view through each aperture is thus a fan-beam projection of the desired cross section onto detector 24 as shown in FIG. 3A.

Each of the apertures of ring aperture array 12 can be modulated using the shutters shown in FIG. 1. In that case the same considerations would again apply. The remainder of the system, using detector output signals 25, is the same as that of FIG. 2. The one exception is that plane selector 36 is not required since only a single plane of source 11 from object 10 is being imaged. Again, depending on the source size, either few or many of the apertures would be open at any time.

FIG. 3 illustrates an alternate method of modulating or shuttering the apertures in a simplified fashion. An additional concentric ring, not shown, which is adjacent to aperture ring 12 can be used. This coding ring has an array of apertures which define the code. It is rotated so as to modulate the apertures of ring aperture array 12. A more flexible arrangement is shown in FIG. 3. A cylinder 50 is used which contains a number of aperture rings each representing a different code. For example, the upper ring, containing apertures 51 and 52, is designed for relatively large sources with relatively few of the apertures open at any time. Conversely the lower ring, including apertures 53 and 54, is designed for smaller sources and thus provides more simultaneous views at any time. The entire cylinder, with its various codes, is rotated using motor 55 and driver wheel 56. To maintain synchronism between the decoding electronics and the modulated apertures, the motor is driven by clock 30 which also provides a clock track for the detector signals.

The desired code is placed in the same plane as the circular aperture array 12 by moving the cylinder 50 axially. This is accomplished by first getting the desired code signal from code selector 41. The selected code on terminal 42 is applied to driver 57 which moves shaft 58 up and down. Shaft 58 drives wheel 59 up and down, along the rim of cylinder 50, so as to translate it axially to the desired position. Wheel 59 is then free to turn as cylinder 50 rotates, modulating the apertures.

Figure 3B:
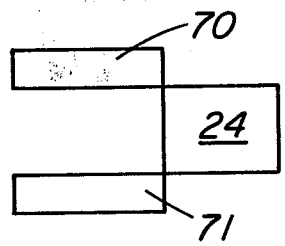
FIG. 3B is a schematic representation illustrating a collimator for the annular detector array.

To avoid photons from undesired regions in the source from impinging on detector 25, an annular collimator can be used to restrict the received photons to the desired cross section. As shown in the cross-sectional view in FIG. 3B, collimators 70 and 71, usually made of lead, are adjacent to detector 24 for its entire circumference and provide the desired shielding.

The system of FIG. 3 illustrates a method of studying a single section in source 11. Alternatively a number of modulated ring aperture arrays 12 and ring detectors 25 can be used simultaneously, with the appropriate processing, to simultaneously provide images of a few sections in source 11.

The reconstruction computer 37 can use any of the previously described systems to reconstruct the desired cross-sectional image of source 11. A system can be used, however, which is particularly applicable to the fan beam geometry. This system by G. N. Ramachandran and A. V. Lakshminarayayanan is entitled "Three-Dimensional Reconstruction from Radiographs and Electron Micrographs: Applications of Convolutions Instead of Fourier Transforms," Proceedings Nat'l. Academy Science, U.S., Vol. 68, pages 2236–2240, 1971.

What is claimed is:

1. Apparatus for producing a three-dimensional tomographic image of a gamma-ray source comprising:
   a detector array, producing an array of detector signals, for determining the position of each photon received from the source;
   an aperture array positioned between the source and the detector array;
   means for modulating the transmission of each of the apertures in the aperture array with an array of separable coding signals;
   means for decoding the array of detector signals using an array of decoding signals which correspond to the separable coding signals to provide an array of projection signals representing the intensity of a projected image of the source through each aperture;
   means for choosing the coding and decoding signals based on the intensity distribution of the source; and
   means for utilizing the projection signals to produce a three-dimensional tomographic image of the source.

2. Apparatus as described in claim 1 wherein the means for choosing the coding and decoding signals is based on prior knowledge of the general size of the source distribution.

3. Apparatus as described in claim 1 wherein the means for choosing the coding and decoding signals is based on an initial analysis of the projection signals using initial coding and decoding signals.

4. Apparatus as described in claim 3 wherein the initial analysis of the projection signals provides a measure of the effective size of the source.

5. Apparatus as described in claim 4 wherein the measure of the effective size of the source includes calculating the ratio of the sum of the intensities of each element of the projected image to the maximum intensity of these elements.

6. Apparatus as described in claim 1 wherein the aperture array is a two-dimensional planar array and the detector array is a two-dimensional planar array parallel to the aperture array.

7. Apparatus as described in claim 1 wherein the aperture array is a circular ring and the detector array is a circular ring which is concentric with and has a larger diameter than that of the aperture array.

8. Apparatus as described in claim 7 wherein the means for modulating each of the apertures of the circular ring aperture array includes an additional circular ring concentric with and adjacent to the circular aperture array having coding apertures which define the coding signal and including means for rotating the additional circular ring.

9. Apparatus as described in claim 7 wherein the means for modulating each of the apertures of the circular ring aperture array includes a cylinder concentric with and adjacent to the circular aperture array having a plurality of rings of coding apertures with each ring defining a different coding signal and including means for rotating the cylinder to modulate the apertures and means for translating the cylinder axially to choose the desired coding signal based on the source distribution.

10. Apparatus as described in claim 7 including collimator plates between the source and the detector array to limit the photons reaching the detector to those representing a cross section of the source.

11. In a method for producing a three-dimensional tomographic image of a gamma-ray source the steps of:
   imaging the source onto a detector array through an array of apertures to produce an array of detector signals;
   modulating each of the apertures with an array of coding signals;
   decoding the detector signals with an array of decoding signals corresponding to the coding signals to produce an array of projection signals representing the intensity of each element of a projected image of the source through each aperture;
   selecting a set of coding and decoding signals based on the distribution of the source; and
   reconstructing a three-dimensional tomographic view of the source using the projection signals.

12. The method of claim 11 wherein the step of selecting the coding and decoding signals is based on apriori knowledge of the general shape of the source.

13. The method of claim 11 wherein the step of selecting the coding and decoding signals is based on an initial analysis of the projection signals using initially chosen coding and decoding signals.

14. The method of claim 13 wherein the initial analysis of the projection signals provides an estimate of the size of the source.

* * * * *